US011199928B2

(12) United States Patent
Gao (10) Patent No.: US 11,199,928 B2
(45) Date of Patent: Dec. 14, 2021

(54) METHOD AND APPARATUS FOR PREVENTING FALSE TOUCH ON EDGE, AND STORAGE MEDIUM (71) Applicant: BEIJING XIAOMI MOBILE SOFTWARE CO., LTD., Beijing (CN)

(72) Inventor: Shang Gao, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/828,524

(22) Filed: Mar. 24, 2020

(65) Prior Publication Data
US 2020/0310619 A1 Oct. 1, 2020

(30) Foreign Application Priority Data
Mar. 29, 2019 (CN) .......................... 201910248184.6

(51) Int. Cl.
G06F 3/041 (2006.01)
(52) U.S. Cl.
CPC .................. G06F 3/04186 (2019.05); G06F 2203/04102 (2013.01)
(58) Field of Classification Search
CPC . G06F 2203/04102; G06F 2203/04104; G06F 3/0416; G06F 3/0418; G06F 3/04186
See application file for complete search history.

(56) References Cited

U.S. PATENT DOCUMENTS

2013/0285956 A1 10/2013 Kamii et al.
2018/0157394 A1* 6/2018 Yamazaki ............. G06F 3/0488
2018/0300015 A1 10/2018 Heo et al.

FOREIGN PATENT DOCUMENTS

| CN | 104020878 A | 9/2014 |
| CN | 105074618 A | 11/2015 |
| CN | 106445238 A | 2/2017 |
| CN | 107272956 A | 10/2017 |
| CN | 108595106 A | 9/2018 |
| WO | 2018048646 A1 | 3/2018 |

OTHER PUBLICATIONS

Extended European Search Report of counterpart EP Application No. 20166823.3 dated Aug. 27, 2020, (8p).
First Office Action of Chinese Application No. 201910248184.6 and English translation dated May 6, 2021.

* cited by examiner

Primary Examiner — Afroza Chowdhury
(74) Attorney, Agent, or Firm — Arch & Lake LLP (57) ABSTRACT

A method, a terminal, and a storage medium are provided for preventing a false touch on an edge. The method is applied to a mobile terminal. A display screen of the mobile terminal is in a folded state. The display screen includes n display areas, and n is a positive integer not less than 2. The method includes: detecting a touch event for at least one edge of the mobile terminal, where the at least one edge is a non-metallic material edge of the mobile terminal; acquiring a gesture of a user currently holding the mobile terminal, when the touch event for the at least one edge is detected; and shielding the touch event for the at least one edge, when the gesture of the user holding the mobile terminal matches a target gesture.

18 Claims, 7 Drawing Sheets

METHOD AND APPARATUS FOR PREVENTING FALSE TOUCH ON EDGE, AND STORAGE MEDIUM

CROSS-REFERENCE TO RELATED APPLICATION

The present application claims priority to Chinese Patent Application No. 201910248184.6 filed on Mar. 29, 2019, and entitled "METHOD AND APPARATUS FOR PREVENTING FALSE TOUCH ON EDGE, AND STORAGE MEDIUM", the disclosure of which is hereby incorporated by reference in its entirety.

TECHNICAL FIELD

The present disclosure relates to the technical field of mobile terminals, and in particular to a method and apparatus for preventing a false touch on an edge, and storage medium.

BACKGROUND

With the rapid development of display hardware technology, foldable flexible display screens have appeared. That is, foldable flexible display screens are provided on mobile terminals. The occupied space of the mobile terminal can be reduced when the flexible display screen is in a folded state. When the flexible display screen is in an unfolded state, it can provide users with a larger screen area and improve the viewing effect of the user.

However, while the flexible display screen brings a significant user experience to the user, it also has the following problems: when in a folded state, the front and back surfaces of the mobile terminal are both display screens, and the folded portion of the screen forms a side edge of the terminal which replaces the metal frame of the terminal which uses a non-foldable screen.

Since the edge of the terminal also belongs to the screen, the user will inevitably touch the screen when holding the mobile terminal, which will cause a very serious problem of false touch on the edge. For this reason, when the mobile terminal is in the folded state, how to prevent the false touch on the edge has become a focus to which those skilled in the art pay attention.

SUMMARY

According to a first aspect of the present disclosure, a method for preventing a false touch on an edge is provided. The method is applied to a mobile terminal including a display screen that includes a plurality of display areas. The method includes: when the mobile terminal is in a folded state, detecting a touch event for at least one edge of the mobile terminal, wherein the at least one edge is a non-metallic material edge of the mobile terminal; acquiring a gesture of a user currently holding the mobile terminal, when the touch event for the at least one edge is detected; and shielding the touch event for the at least one edge, when the gesture of the user holding the mobile terminal matches a target gesture.

According to a second aspect of the present disclosure, a mobile terminal for preventing a false touch on an edge is provided. The mobile terminal includes a display screen of the mobile terminal which includes n display areas, n being a positive integer not less than 2. The mobile terminal includes: a display screen having a folded state and an unfolded state; one or more processors electronically coupled to the display screen; and a memory for storing instructions which are executable by the processor. The one or more processors are configured to: when the display screen is in the folded state, detect a touch event for at least one edge of the mobile terminal, wherein the at least one edge is a non-metallic material edge of the mobile terminal; acquire a gesture of a user currently holding the mobile terminal, when the touch event for the at least one edge is detected; and shield the touch event for the at least one edge, when the gesture of the user holding the mobile terminal matches a target gesture.

According to a third aspect of the present disclosure, a storage medium having computer program instructions stored thereon is provided. The computer program instructions are executed by one or more processors to implement the method for preventing a false touch on the edge according to the first aspect.

It is to be understood that both the foregoing general description and the following detailed description are exemplary and explanatory only and are not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Exemplary embodiments will be described in detail herein, examples of which are illustrated in the accompanying drawings. The following description refers to the accompanying drawings in which the same numbers in different drawings represent the same or similar elements unless otherwise indicated. The implementations set forth in the following examples do not represent all implementations consistent with the present invention. Rather, they are merely examples of devices and methods consistent with certain aspects of the present invention as detailed in the appended claims.

Before explaining the embodiments of the present disclosure in detail, the structure of a mobile terminal is explained below.

The mobile terminal may be a device such as a mobile phone or a tablet. The mobile terminal having a foldable display screen is also called a folding display screen. In addition to a display function, the folding display has foldable characteristics. In the embodiment of the present disclosure, the folding display screen may include at least two screen states of a folded state and an unfolded state. When the folding display screen is in the folded state, the space occupied by the terminal can be reduced, and when in the unfolded state, it can provide a larger screen area for a user.

In the embodiment of the present disclosure, the display screen of the mobile terminal includes n display areas, where n is a positive integer.

As an example, the value of n may be 2. The folding display screen includes two foldable display areas.

In view of this situation, the display screen may be designed as a left-right folding display screen or a top-down folding display screen, or may be designed as an outward-folding display screen or an inward-folding display screen, which is not specifically limited in the embodiments of the present invention.

The following takes the display screen of the mobile terminal being designed as a left-right folding display screen as an example to introduce the structure.

Figure 1:
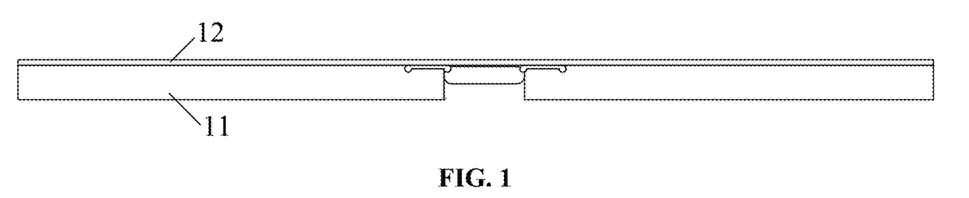
FIG. 1 is a schematic structural diagram of a mobile terminal according to an example.

FIG. 1 is a schematic structural diagram of a mobile terminal according to an example. Referring to FIG. 1, the mobile terminal includes a housing 11 and a display screen 12. One side of the display screen 12 is attached to the housing 11, and the other side is used for display. The housing 11 is a foldable housing.

In a possible implementation, a rotating shaft is provided in the middle of the housing 11, and the housings on two sides of the middle can be rotated around the rotating shaft to control the folding or unfolding of the housing 11 and drive the display screen 12 to be folded or unfolded.

In a possible implementation, the display screen 12 may be a one-piece flexible display screen made of a flexible material, such as plastic, metal foil, or other materials, and is a bendable and deformable display member, and can be unfolded or folded with the housing 11.

Figure 2:
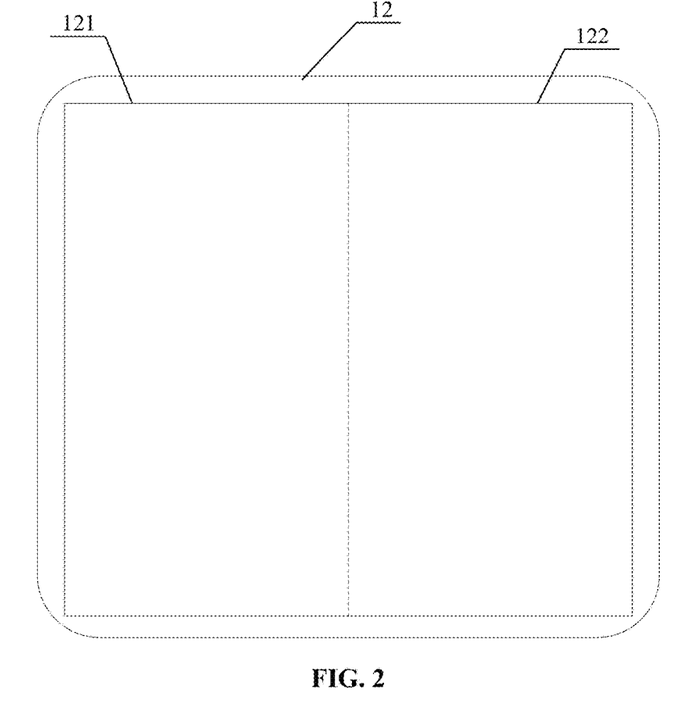
FIG. 2 is a schematic structural diagram of another mobile terminal according to an example.

As shown in FIG. 2, when the display screen 12 is a one-piece flexible display screen, the display screen 12 may be divided into a first display area 121 and a second display area 122. The sizes of the first display area 121 and the second display area 122 may be the same or different, which is not specifically limited in the embodiment of the present disclosure.

Figure 3:
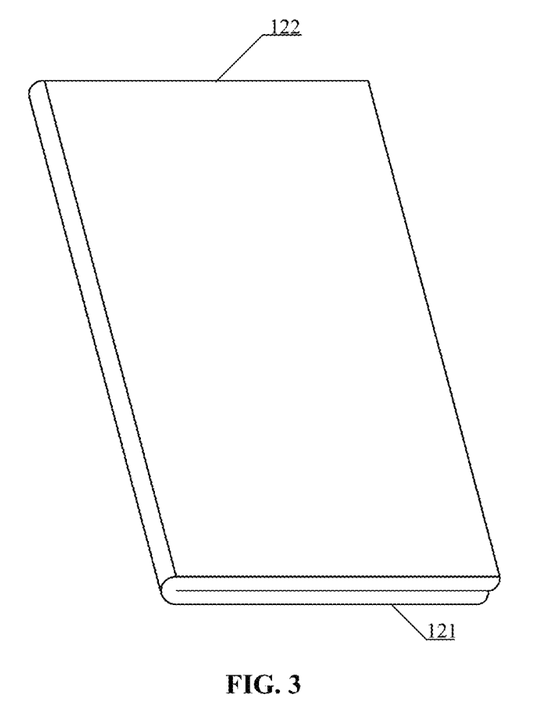
FIG. 3 is a schematic structural diagram of another mobile terminal according to an example.

As an example, referring to FIG. 3, the sizes of the first display area 121 and the second display area 122 are the same. When the display screen 12 is in a folded state, one display area is up (that is, facing the user), and the other display area is down (that is, facing away from the user). That is, the folded state refers to a state in which the first display area 121 and the second display area 122 are parallel and the front surfaces of the two display areas are facing opposite directions. Here, the front surface is the surface used to display the user interface.

Similarly, as shown in FIG. 2, the unfolded state refers to a state in which the first display area 121 and the second display area 122 are unfolded and are in the same plane, and the front surfaces of the two display areas face in the same direction.

Figure 4:
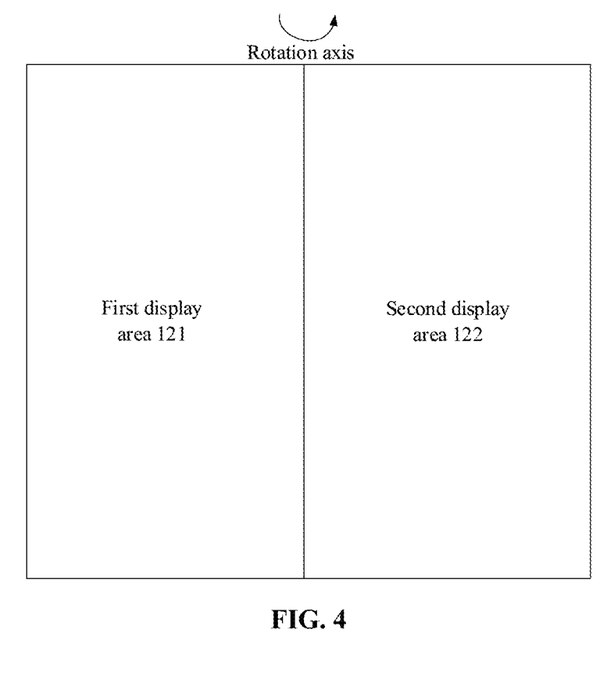
FIG. 4 is a schematic structural diagram of another mobile terminal according to an example.

In a possible implementation, as shown in FIG. 4, the folding direction of the display screen 12 is folding outward. Functional modules such as a camera and a flash can be disposed on the second display area 122 according to the folding direction, which is not specifically limited in the embodiment of the present disclosure.

As another example, the value of n may be 3. That is, the folding display screen includes three foldable display areas. In a possible implementation, the three display areas include a main screen and two auxiliary screens.

In view of this situation, the display screen of the mobile terminal may be designed as a left-right folding display screen or a top-down folding display screen, or may be designed as an outward-folding display screen or an inward-folding display screen, which is not specifically limited in the embodiment of the present disclosure.

Example 1

Figure 5:
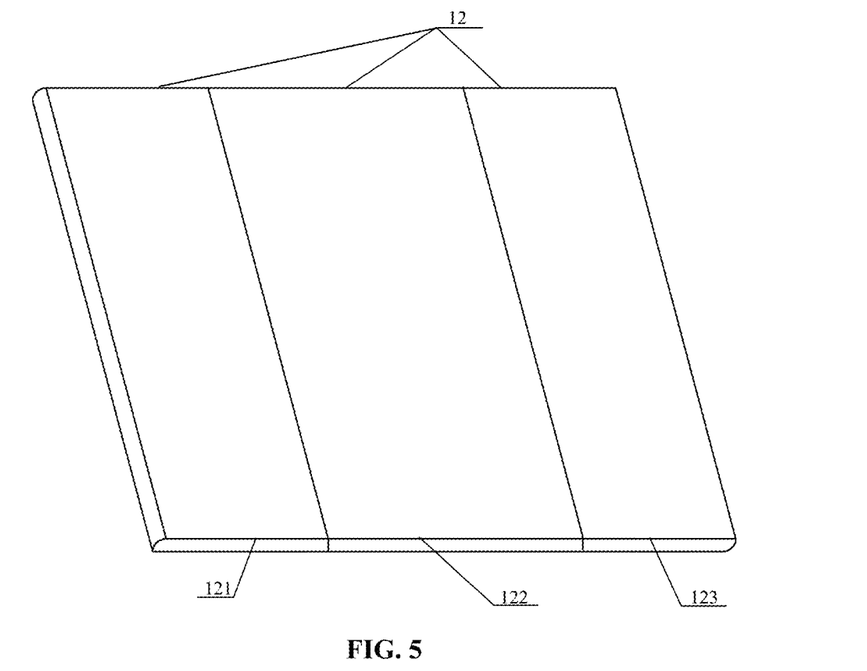
FIG. 5 is a schematic structural diagram of another mobile terminal according to an example.

Taking the display screen of the mobile terminal being designed as a left-right folding display screen as an example, as shown in FIG. 5, when the display screen 12 is an one-piece flexible display screen, the display screen 12 may be divided into three display areas, i.e., a main screen 122, a first auxiliary screen 121, and a second auxiliary screen 123.

For this situation, the screen state includes three states: a folded state, an unfolded state, and a semi-unfolded state. The screen state of the display screen 12 may be any one of a folded state, an unfolded state, and a semi-unfolded state.

Figure 6:
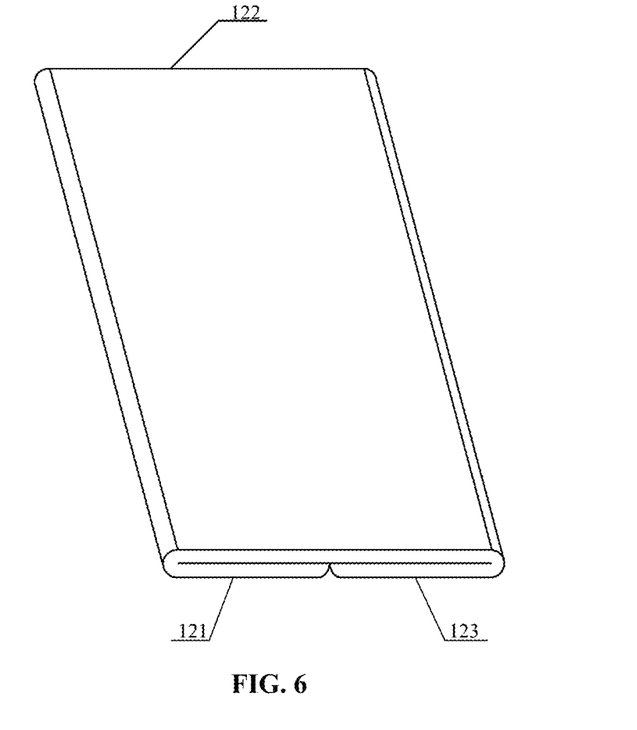
FIG. 6 is a schematic structural diagram of another mobile terminal according to an example.

Exemplarily, as shown in FIG. 6, the folded state refers to a state where the main screen 122, the first auxiliary screen 121, and the second auxiliary screen 123 are all parallel, and the front surfaces of the first auxiliary screen 121 and the second auxiliary screen 123 and the front surface of the main screen 122 face in opposite directions.

Exemplarily, as shown in FIG. 5, the unfolded state refer to a state in which the main screen 122, the first auxiliary screen 121, and the second auxiliary screen 123 are on the same plane, and the front surfaces of the first auxiliary screen 121 and the second auxiliary screen 123 and the front surface of the main screen 122 face in the same direction.

Figure 7:
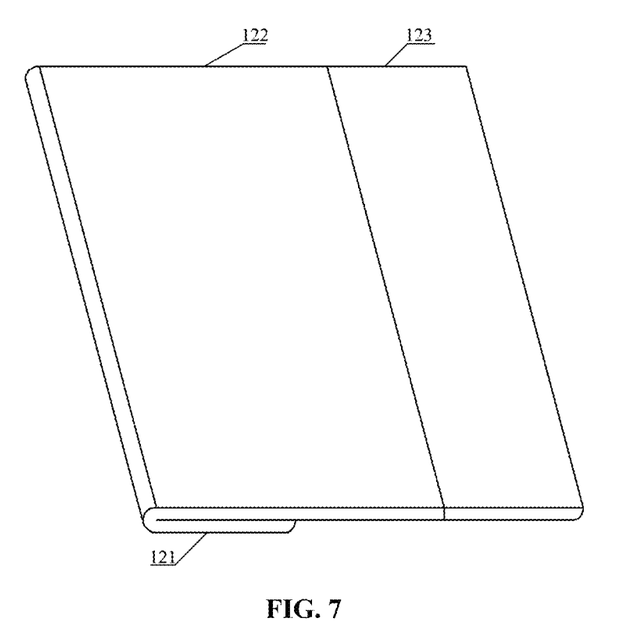
FIG. 7 is a schematic structural diagram of another mobile terminal according to an example.

Exemplarily, as shown in FIG. 7, the semi-unfolded state refers to a state between the folded state and the unfolded state. That is, one of the two auxiliary screens is in the unfolded state and the other auxiliary screen is in the folded state. At this time, the main screen 122 is on the same plane as one of the auxiliary screens (such as the first auxiliary screen 121 or the second auxiliary screen 123), the front surface of the main screen 122 and the front surface of the auxiliary screen face in the same direction, and the front surface of the main screen 122 and the front surface of the other auxiliary screen face in opposite directions.

Example 2

Figure 8:
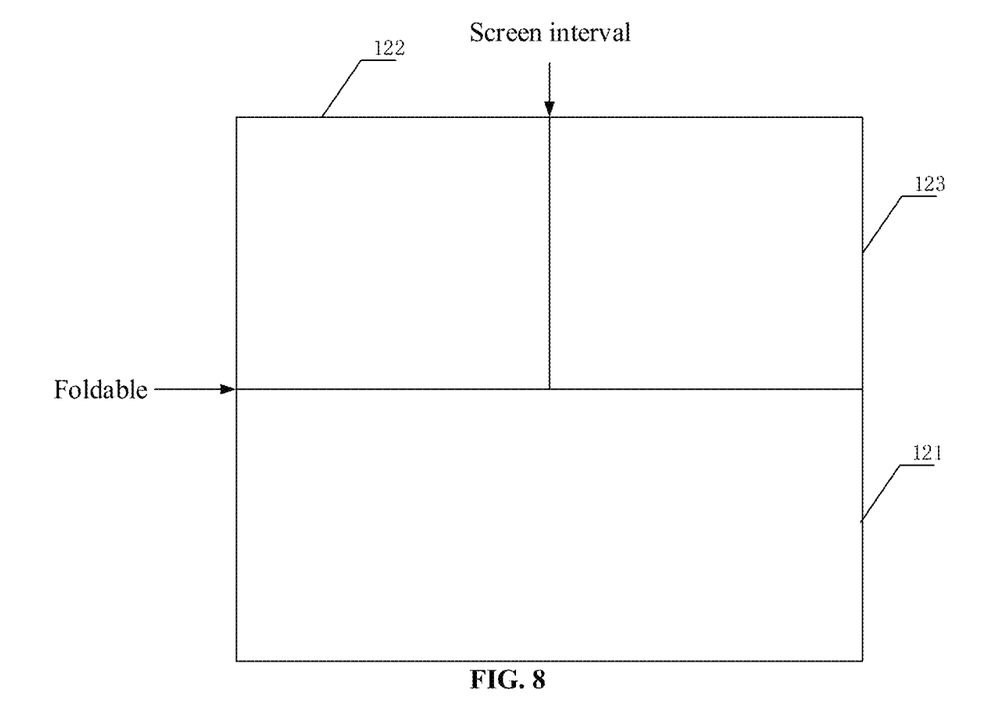
FIG. 8 is a schematic structural diagram of another mobile terminal according to an example.

Taking the display screen of the mobile terminal being designed as an up-and-down folding display screen as an example, FIG. 8 shows a schematic structural diagram of another mobile terminal in an unfolded state.

Referring to FIG. 8, the display screen 12 includes a main screen 121, a first auxiliary screen 122, and a second auxiliary screen 123. The above three display areas may also be referred to as a first display area, a second display area, and a third display area.

In a possible implementation, the above three display areas may be an integrated structure. That is, a first display area, a second display area, and a third display area are formed by dividing an area of a complete display screen. In view of this situation, in a folded state, the second display area and the third display area may both fit the first display area.

In another possible implementation, the second display area and the third display area may also be separate structures. For this situation, only the second display area may be selected to fit the first display area. Alternatively, only the third display area may be selected to fit the first display area.

Exemplarily, the size of the first display area is the same as that of the entirety of the second display area and the third display area. Exemplarily, when the display screen 12 is in a folded state, the first display area may be up (that is, facing the user), and the second display area and the third display area may be down (that is, backing to the user), which is not specifically limited in the embodiments of the present disclosure.

It should be noted that the display screen of the mobile terminal may be further divided into more display areas in a similar manner as described above, which is not specifically limited in the embodiment of the present disclosure.

Figure 9:
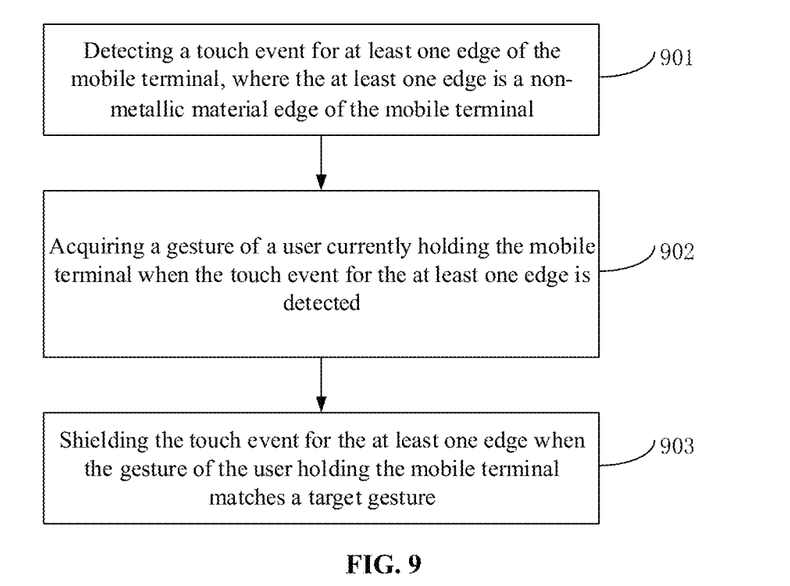
FIG. 9 is a flowchart of a method for preventing a false touch on an edge according to an example.

FIG. 9 is a flowchart of a method for preventing edge touch by mistake according to an example. As shown in FIG. 9, the method is applied to a mobile terminal whose display screen is in a folded state and includes n display areas, n being a positive integer not less than 2. The method includes the following steps.

In step 901, a touch event for at least one edge of the mobile terminal is detected, where the at least one edge is a non-metallic material edge of the mobile terminal.

In step 902, when the touch event for the at least one edge is detected, a gesture of a user currently holding the mobile terminal is acquired.

In step 903, when the gesture of the user holding the mobile terminal matches a target gesture, the touch event for the at least one edge is identified as a false touch and the touch event is shielded. For example, when the touch event is identified as a false touch, no touch event or touch signal is sent to other programs so that the at least one edge does not respond to the false touch. Thus, false touch operations are prevented.

According to the method provided by the embodiment of the present disclosure, when detecting a touch event for at least one non-metal material edge, a mobile terminal in a folded state acquires a gesture of a user currently holding the body and determines whether the gesture matches a target gesture; when the gesture matches a target gesture, the mobile terminal identifies the touch event as a false touch operation triggered by the user inactively, that is, the mobile terminal shields the touch event. In other words, the embodiments of present disclosure realize the prevention of the false touch on the edge through user gesture recognition, which is not only more accurate, but also effectively reduces the occurrence of false touch on the edge, significantly improves the user's usage experience of using a foldable mobile terminal and the prevention of the false touch operation has a better effect.

In a possible implementation, when the gesture of the user holding the mobile terminal matches a target gesture, shielding the touch event for the at least one edge includes: when the gesture of the user holding the mobile terminal is holding with one hand, the touch event for the at least one edge is shielded; or, when the gesture of the user holding the mobile terminal is holding with two hands, the touch event for the at least one edge is shielded.

In a possible implementation, when the gesture of the user holding the mobile terminal matches a target gesture, shielding the touch event for the at least one edge includes: when a contact area of the user's hand with the display screen is greater than a target threshold and a contact shape meets a target condition, it is determined that the gesture of the user holding the mobile terminal matches the target gesture and the touch event is shielded.

In a possible implementation, when a contact area of the user's hand with the display screen is greater than a target threshold and a contact shape meets a target condition, determining that the gesture of the user holding the mobile terminal matches the target gesture includes: when the contact area of the user's hand with the display screen is greater than the target threshold and the contact shape indicates that four fingers other than the thumb of the user's hand are in contact with the display screen, determining that the gesture of the user holding the mobile terminal with one hand is the target gesture; or, when the contact area of the user's hand with the display screen is greater than the target threshold and the contact shape indicates that more than four fingers of the user's hand except the thumb are in contact with the display screen, determining that the gesture of the user holding the mobile terminal with two hands is the target gesture.

In a possible implementation, the method further includes: when the gesture of the user holding the mobile terminal does not match the target gesture, responding to the touch event for the at least one edge.

All the above-mentioned optional technical solutions may adopt any combination to form optional embodiments of the present disclosure, which will not be described in detail here.

Figure 10:
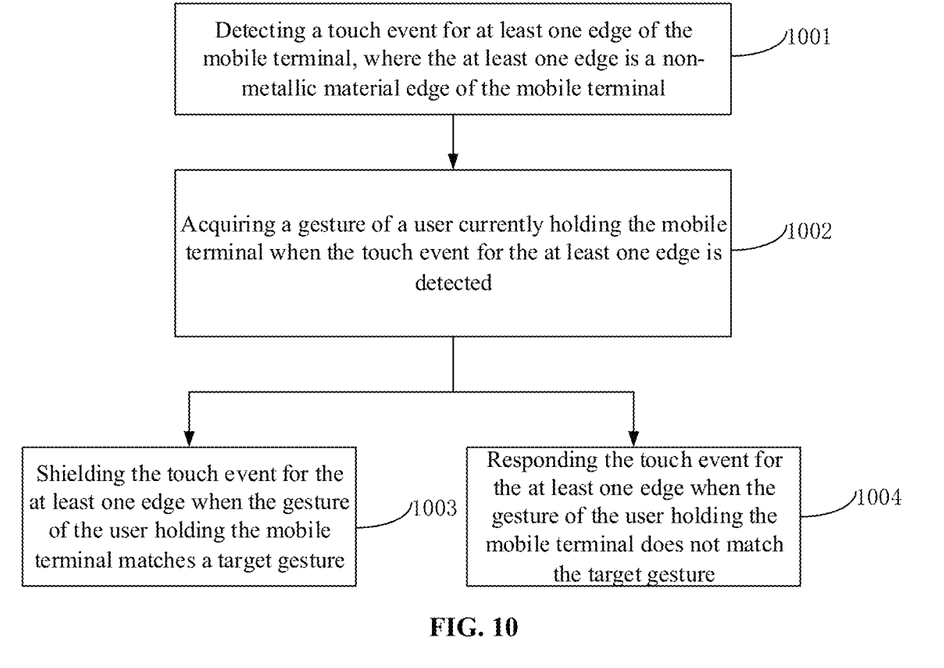
FIG. 10 is a flowchart of a method for preventing a false touch on an edge according to another example.

FIG. 10 is a flowchart of a method for preventing a false touch on an according to an example. As shown in FIG. 10, the method is applied to a mobile terminal whose display screen is in a folded state and includes n display areas, n being a positive integer not less than 2. The method includes the following steps.

In step 1001, a touch event for at least one edge of the mobile terminal is detected, where the at least one edge is a non-metallic material edge of the mobile terminal.

An edge touch function can extend an operable area of the mobile terminal to peripheral edges. For example, when taking a picture, a user can tap left and right edges of the mobile terminal to start a shutter; and when browsing a web page, the user can tap the left and right edges of the mobile terminal twice to quickly return without the need to find a return key.

Based on the above description, it can be known that the appearance of the edge touch function is to facilitate the user to manipulate the mobile terminal. Since the return key of the mobile terminal is usually designed at a lower position of the body, when the user uses the return key, the thumb needs to be moved from the edge of the body to the lower position of the body, that is, the thumb needs to travel long distances to reach the return key. After the edge touch function is provided, the movement distance of the thumb is greatly reduced, thereby saving time and effort.

However, when the edge touch function is applied on a foldable mobile terminal, there will be a serious problem of false touch on the edge. This is because for a foldable mobile terminal, the edge also belongs to the display screen. That is, in a folded state, because the front and back surfaces of the mobile terminal are both display screens, and the folded portion of the screen forms an edge of the terminal and replace the metal frame on one side of the terminal which uses a non-foldable screen. When the user holds the mobile terminal, it is inevitable to touch the screen area, and then the problem of the false touch on the edge is occurred.

In related technologies, for a mobile terminal provided with a non-foldable screen, in order to prevent the false touch on the edge, a certain range of area is provided at the edge portion of the mobile terminal. When detecting a touch event against the area, the mobile terminal determines whether the touch is a false touch operation through a delayed response strategy.

However, for a foldable mobile terminal, since the screen extends to the back of the body, that is, the front and back surfaces are both display screens in a folded state, the concept of the edge position is blurred, and thus the above solution is also difficult to be implemented on the foldable mobile terminal. To this end, the embodiment of the present disclosure proposes to solve the problem of the false touch on the edge of a foldable mobile terminal through intelligent gesture recognition.

Exemplarily, for the structure of the mobile terminal shown in FIG. 1 to FIG. 4, at least one edge includes three frames, and one frame is formed by the display screen at one side. In a possible implementation, the above three frames may be narrow metal frames, which is not specifically limited in the embodiment of the present disclosure. For the structure of the mobile terminal shown in FIG. 5 to FIG. 8, the left and right edges are both edges formed by the display screen.

The touch event may be a single-tap operation, a multiple-tap operation, or a long-press operation and the like, which is not specifically limited in this embodiment of the present disclosure.

In step 1002, when the touch event for the at least one edge is detected, a gesture of a user currently holding the mobile terminal is acquired.

In the embodiment of the present disclosure, when detecting a touch event for the at least one edge, the mobile terminal first identifies whether the current operation is a false operation triggered by the user. If the current operation is the false operation triggered by the user rather than an operation actively triggered by the user, the terminal performs the following step 1003. If the current operation is not the false operation and is actively triggered by the user, the mobile terminal performs the following step 1004.

The mobile terminal determines whether the detected touch event is actively triggered by the user according to the gesture of the user currently holding the mobile terminal. Exemplarily, since the side of the mobile terminal facing the user and the other side backing to the user are both display screens, the acquisition of the user's gesture by the mobile terminal may be realized by combining the display screen backing to the user and a built-in sensor of the mobile terminal, which is not specifically limited in this embodiment of the present disclosure.

In step 1003, when the gesture of the user holding the mobile terminal matches a target gesture, the touch event for the at least one edge is shielded.

Figure 11:
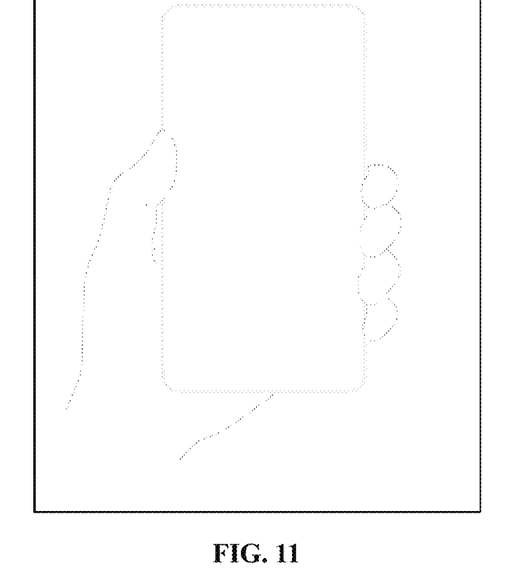
FIG. 11 is a schematic diagram of holding a mobile terminal with one hand according to an example.

In general, the user's holding operation on the mobile terminal shown in FIG. 11 will cause the user's finger to touch the edge position of the terminal, thereby causing the problem of the false touch on the. Therefore, the target gesture refers to the user's holding gesture on the mobile terminal in the embodiments of the present disclosure.

Figure 12:
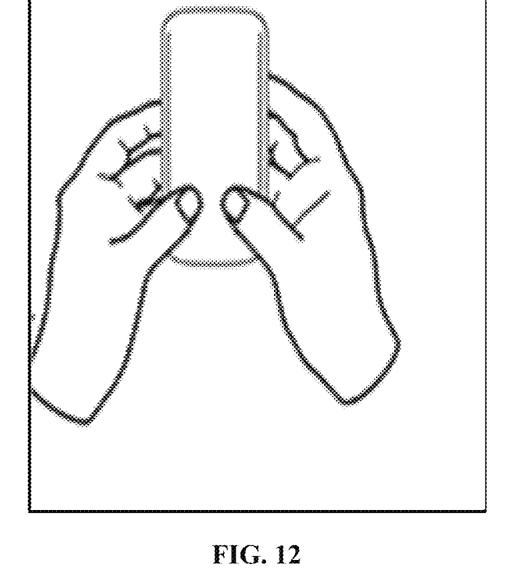
FIG. 12 is a schematic diagram of holding a mobile terminal with two hands according to an example.

It should be noted that, in addition to the gesture of holding with one hand shown in FIG. 11, the holding gesture also includes a two-handed holding operation of the mobile terminal by the user shown in FIG. 12. In other words, when the gesture of the user holding the mobile terminal matches a target gesture, shielding the touch event for the at least one edge includes but is not limited to: when the gesture of the user holding the mobile terminal is holding with one hand, the touch event is shielded; or when the gesture of the user holding the mobile terminal is holding with two hands, the touch event is shielded.

In the embodiment of the present disclosure, when the user holds the mobile terminal, the user's hand forms a certain range of contact area on the back surface of the mobile terminal. In combination with the side of the mobile terminal backing to the user can also sense the characteristics of the user's touch, the embodiments of the present disclosure can accurately determine whether the user is currently holding the mobile terminal by using an intelligent recognition algorithm.

Exemplarily, the mobile terminal determines whether the user is currently holding the mobile terminal by identifying a contact area of the user's hand with the display screen and a contact shape. When determining that the user's hand is currently holding the mobile terminal, the mobile terminal automatically shields the detected touch event to ensure a normal operation within the display screen. When determining that the user's hand is not currently holding the mobile terminal, the mobile terminal allows the touch event. For example, for the structure of the mobile terminal shown in FIG. 1 to FIG. 4, assuming that the first display area faces the user and the second display area backs to the user, the mobile terminal identifies a contact area of the user's hand with the second display area and a contact shape. For the mobile terminal structure shown in FIG. 5 to FIG. 8, assuming that the main screen faces the user and the two auxiliary screens back to the user, the mobile terminal identifies a contact area of the user's hand with the two auxiliary screens and the contact shape.

In other words, whether for a one-handed holding operation or a two-handed holding operation, they can both be determined whether the user is currently holding the mobile terminal according to the contact area of the user's hand with the display screen and the contact shape. That is, when the gesture of the user holding the mobile terminal matches a target gesture, shielding the touch event for the at least one edge includes but is not limited to: when the contact area of the user's hand with the display screen is greater than a target threshold and the contact shape meets a target condition, it is determined that the gesture of the user holding the mobile terminal matches the target gesture and the detected touch event is shielded.

In a possible implementation, for holding with one hand, when the contact area of the user's hand with the display screen is greater than the target threshold and the contact shape indicates that four fingers in the user's hand other than the thumb are in contact with the display screen, it is determined that the gesture of the user holding the mobile terminal with one hand is the target gesture.

Exemplarily, as shown in FIG. 11, when the mobile terminal is held with one hand, the remaining four fingers except the thumb cover the display screen, and each finger has a contact point on the display screen to form a discontinuous contact shape on the display screen.

In another possible implementation, for holding with two hands, when the contact area of the user's hand with the display screen is greater than the target threshold and the contact shape indicates that more than four fingers in the user's hand other than the thumb are in contact with the display screen, it is determined that the gesture of the user holding the mobile terminal with two hands is the target gesture.

Exemplarily, as shown in FIG. 12, when the mobile terminal is held with two hands, at least four of the remaining eight fingers except the thumb usually cover the display screen, and at least four fingers have contact points on the display screen to form a discontinuous contact shape on the display screen.

In addition, for the case of holding with two hands, the contact area of the user's hand with the display screen is generally greater than the contact area in a case of holding with one hand.

In step 1004, when the gesture of the user holding the mobile terminal does not match the target gesture, the touch event for the at least one edge is responded.

In the embodiment of the present disclosure, if the gesture of the user holding the mobile terminal does not match the target gesture, it indicates that the current touch event for the at least one edge is actively triggered by the user, and the mobile terminal responds to the touch event. That is, a function matching the touch event is activated, such as activating a shutter or quickly returning from a page currently displayed on the display screen, which is not specifically limited in this embodiment of the present disclosure.

In summary, the embodiments of the present disclosure automatically adjust the strategy of preventing the false touch on the edge according to the gesture of the user holding the mobile terminal to achieve the scene-optimized effect and effectively reduce the occurrence of the false touch on the edge, thereby improving user's usage experience with mobile terminals. In detail, the embodiment of the present disclosure combines the characteristics of the foldable flexible display screen, adopts the property that the display screen on the side backing to the user can also sense the user's touch after the flexible display screen is folded, and acquire the characteristics of the user's gesture through the display screen on the side, and then assist the mobile terminal to accurately identify the operation of the false touch on the edge based on the acquired gesture characteristics.

According to the method provided by the embodiment of the present disclosure, when detecting a touch event for at least one non-metal material edge, a mobile terminal in a folded state acquires a gesture of a user currently holding the body and determines whether the gesture matches a target gesture; when the gesture matches a target gesture, the mobile terminal identifies the touch event as a false touch operation triggered by the user inactively, that is, the mobile terminal shields the touch event. In other words, the embodiments of present disclosure realize the prevention of the false touch on the edge through user gesture recognition, which is not only more accurate, but also effectively reduces the occurrence of the false touch on the edge significantly improves the user's usage experience of using a foldable mobile terminal and the prevention of the false touch operation has a better effect.

Figure 13:
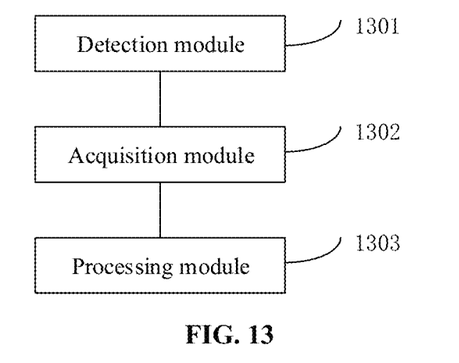
FIG. 13 is a block diagram of an apparatus for preventing a false touch on an edge according to an example.

FIG. 13 is a block diagram of an apparatus for preventing edge touch by mistake according to an example. Referring to FIG. 13, the apparatus is applied to a mobile terminal. The display screen of the mobile terminal is in a folded state. The display screen includes n display areas, n being a positive integer not less than 2. The apparatus includes a detection module 1301, an acquisition module 1302 and a processing module 1303. The processing module 1303 may include one or more processors.

The detection module 1301 is configured to detect a touch event for at least one edge of the mobile terminal, where the at least one edge is a non-metallic material edge of the mobile terminal.

The acquisition module 1302 is configured to acquire a gesture of a user currently holds the mobile terminal when the touch event for the at least one edge is detected.

The processing module 1303 is configured to shield the touch event for the at least one edge when the gesture of the user holding the mobile terminal matches a target gesture.

According to the apparatus provided by the embodiment of the present disclosure, when detecting a touch event for at least one non-metal material side edge, a mobile terminal in a folded state acquires a gesture of a user currently holding the body, and determines whether the gesture matches a target gesture; when the gesture matches a target gesture, the mobile terminal identifies the touch event as a false touch operation triggered by the user inactively, that is, the mobile terminal shields the touch event. In other words, the embodiments of present disclosure realize the prevention of the false touch on the edge through user gesture recognition, which is not only more accurate, but also effectively reduces the occurrence of the false touch on the edge significantly improves the user's usage experience of using a foldable mobile terminal and the prevention of the false touch operation has a better effect.

In a possible implementation, the processing module 1303 is further configured to shield the touch event for the at least one edge when the gesture of the user holding the mobile terminal is holding with one hand; or shield the touch event for the at least one edge when the gesture of the user holding the mobile terminal is holding with two hands.

In a possible implementation, the processing module 1303 is further configured to determine that the gesture of the user holding the mobile terminal matches the target gesture and shield the touch event, when a contact area of the user's hand with the display screen is greater than a target threshold and a contact shape meets a target condition.

In a possible implementation, the processing module 1303 is further configured to determine that the gesture of the user holding the mobile terminal with one hand is the target gesture, when the contact area of the user's hand with the display screen is greater than the target threshold and the contact shape indicates that four fingers other than the thumb in the user's hand are in contact with the display screen; or to determine that the gesture of the user holding the mobile terminal with two hands is the target gesture, when the contact area of the user's hand with the display screen is greater than the target threshold and the contact shape indicates that more than four fingers of the user's hand except the thumb are in contact with the display screen.

In a possible implementation, the processing module 1303 is further configured to respond to the touch event for the at least one edge, when the gesture of the user holding the mobile terminal does not match the target gesture.

All the above-mentioned optional technical solutions may adopt any combination to form optional embodiments of the present disclosure, which will not be repeated one by one here.

With regard to the apparatus in the aforesaid embodiments, the specific manner in which the respective modules perform the operations has been described in detail in embodiments of the methods, and will not be explained in detail herein.

Figure 14:
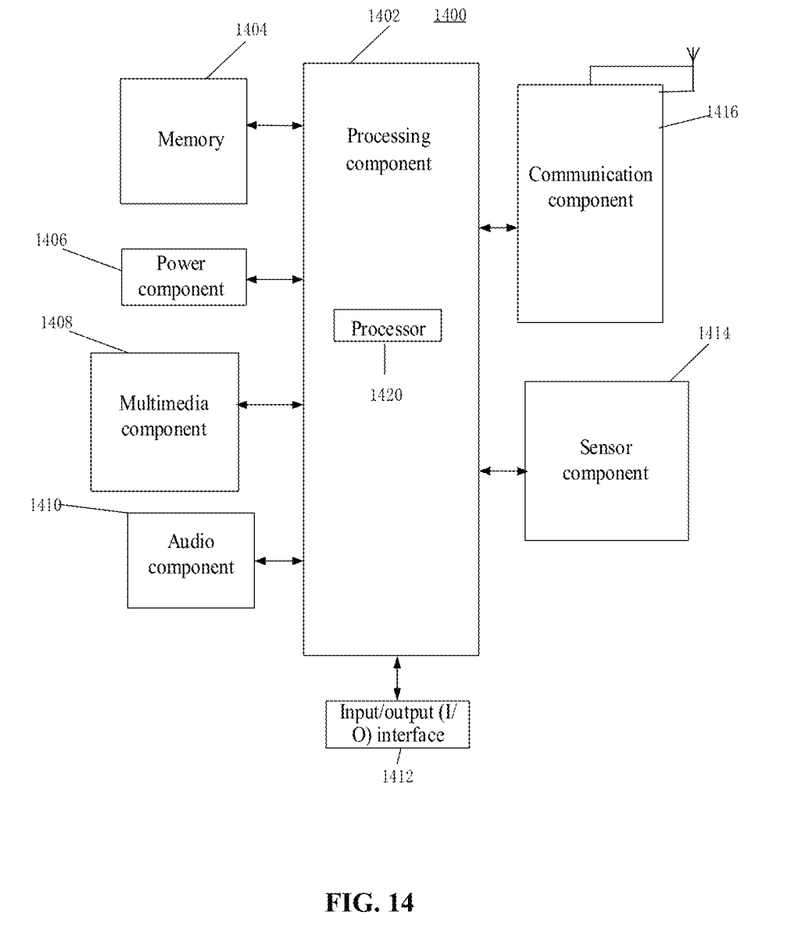
FIG. 14 is a block diagram of an apparatus for preventing a false touch on an edge according to an example.

FIG. 14 is a block diagram of an apparatus 1400 for preventing a false touch on the edge according to an example of the present disclosure. For example, the apparatus 1400 may be a mobile phone, a computer, a digital broadcast terminal, a message transceiver device, a game console, a tablet device, a piece of medical equipment, a piece of fitness equipment, a personal digital assistant, and the like.

Referring to FIG. 14, the apparatus 1400 may include one or more of the following components: a processing component 1402, a memory 1404, a power component 1406, a multimedia component 1408, an audio component 1410, an input/output (I/O) interface 1412, a sensor component 1414, and a communication component 1416.

The processing component 1402 typically controls overall operations of the apparatus 1400, such as the operations associated with display, telephone calls, data communications, camera operations, and recording operations. The processing component 1402 may include one or more processors 1420 to execute instructions to perform all or part of the steps in the above described methods. Moreover, the processing component 1402 may include one or more modules which facilitate the interaction between the processing component 1402 and other components. For instance, the processing component 1402 may include a multimedia module to facilitate the interaction between the multimedia component 1408 and the processing component 1402.

The memory 1404 is configured to store various types of data to support the operation of the apparatus 1400. Examples of such data include instructions for any applications or methods operated on the apparatus 1400, contact data, phonebook data, messages, pictures, video, etc. The memory 1404 may be implemented using any type of volatile or non-volatile memory devices, or a combination thereof, such as a static random-access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1406 provides power to various components of the apparatus 1400. The power component 1406 may include a power management system, one or more power sources, and any other components associated with the generation, management, and distribution of power in the apparatus 1400.

The multimedia component 1408 includes a screen providing an output interface between the apparatus 1400 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, slips, and gestures on the touch panel. The touch sensors may not only sense a boundary of a touch or slip action, but also sense a period of time and a pressure associated with the touch or slip action. In some embodiments, the multimedia component 1408 includes a front camera and/or a rear camera. The front camera and the rear camera may receive an external multimedia datum while the apparatus 1400 is in an operation mode, such as a photographing mode or a video mode. Each of the front camera and the rear camera may be a fixed optical lens system or have focus and optical zoom capability.

The audio component 1410 is configured to output and/or input audio signals. For example, the audio component 1410 includes a microphone ("MIC") configured to receive an external audio signal when the apparatus 1400 is in an operation mode, such as a call mode, a recording mode, and a voice recognition mode. The received audio signal may be further stored in the memory 1404 or transmitted via the communication component 1416. In some embodiments, the audio component 1410 further includes a speaker to output audio signals.

The I/O interface 1412 provides an interface between the processing component 1402 and peripheral interface modules, such as a keyboard, a click wheel, buttons, and the like. The buttons may include, but are not limited to, a home button, a volume button, a starting button, and a locking button.

The sensor component 1414 includes one or more sensors to provide status assessments of various aspects of the apparatus 1400. For instance, the sensor component 1414 may detect an open/closed status of the apparatus 1400, relative positioning of components, e.g., the display and the keypad, of the apparatus 1400, a change in position of the apparatus 1400 or a component of the apparatus 1400, a presence or absence of user contact with the apparatus 1400, an orientation or an acceleration/deceleration of the apparatus 1400, and a change in temperature of the apparatus 1400. The sensor component 1414 may include a proximity sensor configured to detect the presence of nearby objects without any physical contact. The sensor component 1414 may also include a light sensor, such as a complementary metal oxide semiconductor (CMOS) or charge-coupled device (CCD) image sensor, for use in imaging applications. In some embodiments, the sensor component 1414 may also include an accelerometer sensor, a gyroscope sensor, a magnetic sensor, a pressure sensor, or a temperature sensor.

The communication component 1416 is configured to facilitate communication, wired or wirelessly, between the apparatus 1400 and other devices. The apparatus 1400 can access a wireless network based on a communication standard, such as WiFi, 2G, or 3G, or a combination thereof. In one example, the communication component 1416 receives a broadcast signal or broadcast associated information from an external broadcast management system via a broadcast channel. In one example, the communication component 1416 further includes a near field communication (NFC) module to facilitate short-range communications.

In examples, the apparatus 1400 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components for executing the above methods for preventing edge touch by mistake.

In examples, there is also provided a non-temporary computer-readable storage medium including instructions, such as the memory 1404 including instructions. These instructions may be loaded and executed by the processor 1420 in the apparatus 1400 for executing the above methods. For example, the non-transitory computer readable storage medium may be a ROM, a random-access memory (RAM), a CD-ROM, a magnetic tape, a floppy disk, an optical data storage device or the like.

There is also provided a non-temporary computer-readable storage medium. When the instructions in the storage medium are executed by one or more processors of a mobile terminal, the mobile terminal can be caused to execute the above methods for preventing edge touch by mistake.

Other embodiments of the present disclosure will be apparent to those skilled in the art from consideration of the specification and practice of the present disclosure. This application is intended to cover any variations, uses, or adaptations of the present disclosure following the general principles thereof and including common knowledge or commonly used technical measures which are not disclosed herein. The specification and embodiments are to be considered as exemplary only, with a true scope and spirit of the present disclosure is indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A method, comprising:
    detecting, by a mobile terminal having a display screen which is in a folded state and a front surface and a back surface of the mobile terminal are both the display screen, a touch event for at least one edge of the mobile terminal, wherein the at least one edge is a non-metallic material edge of the mobile terminal;
    acquiring a gesture of a user currently holding the mobile terminal, when the touch event for the at least one edge is detected;
    identifying the touch event as a false touch and shielding the touch event for the at least one edge, when determining that the gesture of the user holding the mobile terminal matches a target gesture, wherein the target gesture is a specified gesture for holding the mobile terminal by using a contact shape of the user's hand with the display screen, and the contact shape corresponding to the target gesture indicates that four fingers other than a thumb of the user's hand are in contact with the display screen, or more than four fingers other than thumbs of the user's hands are in contact with the display screen; and
    responding to the touch event for the at least one edge, when the gesture of the user holding the mobile terminal does not match the target gesture.

2. The method according to claim 1, wherein shielding the touch event for the at least one edge, when determining that the gesture of the user holding the mobile terminal matches a target gesture comprises:
    shielding the touch event for the at least one edge, when the gesture of the user holding the mobile terminal is holding with at least one hand.

3. The method according to claim 1, wherein shielding the touch event for the at least one edge, when determining that the gesture of the user holding the mobile terminal matches a target gesture comprises:
    determining that the gesture of the user holding the mobile terminal matches the target gesture and shielding the touch event, when a contact area of a user's hand with the display screen is greater than a target threshold and the contact shape meets a target condition.

4. The method according to claim 3, wherein determining the gesture of the user holding the mobile terminal matches the target gesture, when the contact area of the user's hand with the display screen is greater than the target threshold and the contact shape meets the target condition comprises:
    determining that the gesture of the user holding the mobile terminal with one hand is the target gesture, when the contact area of the user's hand with the display screen is greater than the target threshold and the contact shape indicates that four fingers other than a thumb in the user's hand are in contact with the display screen.

5. The method according to claim 3, wherein determining the gesture of the user holding the mobile terminal matches the target gesture, when the contact area of the user's hand with the display screen is greater than the target threshold and the contact shape meets the target condition comprises:
    determining that the gesture of the user holding the mobile terminal with two hands is the target gesture, when the contact area of the user's hand with the display screen is greater than the target threshold and the contact shape indicates that more than four fingers of the user's hands other than thumbs are in contact with the display screen.

6. The method according to claim 2, wherein shielding the touch event for the at least one edge, when determining that the gesture of the user holding the mobile terminal matches a target gesture comprises:
    determining that the gesture of the user holding the mobile terminal matches the target gesture and shielding the touch event, when a contact area of the user's hand with the display screen is greater than a target threshold and the contact shape meets a target condition.

7. A mobile terminal, comprising:
    a display screen having a folded state and an unfolded state;
    one or more processors electronically coupled to the display screen; and
    a memory for storing instructions which are executable by the one or more processors;
    wherein the one or more processors are configured to:
        when the display screen is in the folded state and a front surface and a back surface of the mobile terminal are both the display screen, detect a touch event for at least one edge of the mobile terminal, wherein the at least one edge is a non-metallic material edge of the mobile terminal;
        acquire a gesture of a user currently holding the mobile terminal, when the touch event for the at least one edge is detected;
        identify the touch event as a false touch and shield the touch event for the at least one edge, when determining that the gesture of the user holding the mobile terminal matches a target gesture, wherein the target gesture is a specified gesture for holding the mobile terminal by using a contact shape of the user's hand with the display screen, and the contact shape corresponding to the target gesture indicates that four fingers other than a thumb of the user's hand are in contact with the display screen, or more than four fingers other than thumbs of the user's hands are in contact with the display screen; and
        respond to the touch event for the at least one edge, when the gesture of the user holding the mobile terminal does not match the target gesture.

8. The mobile terminal according to claim 7, wherein the one or more processors are further configured to:
    shield the touch event for the at least one edge when the gesture of the user holding the mobile terminal is holding with at least one hand.

9. The mobile terminal according to claim 7, wherein the one or more processors are further configured to determine that the gesture of the user holding the mobile terminal matches the target gesture and shield the touch event for the at least one edge, when a contact area of the user's hand with the display screen is greater than a target threshold and the contact shape meets a target condition.

10. The mobile terminal according to claim 9, wherein the one or more processors are further configured to: determine that the gesture of the user holding the mobile terminal with one hand is the target gesture, when the contact area of the user's hand with the display screen is greater than the target threshold and contact shape indicates that four fingers other than a thumb in the user's hand are in contact with the display screen.

11. The mobile terminal according to claim 9, wherein the one or more processors are further configured to determine that the gesture of the user holding the mobile terminal with two hands is the target gesture, when the contact area of the user's hand with the display screen is greater than the target threshold and the contact shape indicates that more than four fingers of the user's hands other than thumbs are in contact with the display screen.

12. The mobile terminal according to claim 8, wherein the one or more processors are further configured to determine that the gesture of the user holding the mobile terminal matches the target gesture and shield the touch event for the at least one edge, when a contact area of the user's hand with the display screen is greater than a target threshold and the contact shape meets a target condition.

13. A non-transitory storage medium having computer program instructions stored thereon, wherein the computer program instructions, when executed by one or more processors, causing the one or more processors to perform acts comprising:
  detecting a touch event for at least one edge of a mobile terminal when the mobile terminal has a display screen in a folded state and a front surface and a back surface of the mobile terminal are both the display screen, wherein the at least one edge is a non-metallic material edge of the mobile terminal;
  acquiring a gesture of a user currently holding the mobile terminal, when the touch event for the at least one edge is detected;
    identifying the touch event as a false touch and shielding the touch event for the at least one edge, when determining that the gesture of the user holding the mobile terminal matches a target gesture, wherein the target gesture is a specified gesture for holding the mobile terminal by using a contact shape of the user's hand with the display screen, and the contact shape corresponding to the target gesture indicates that four fingers other than a thumb of the user's hand are in contact with the display screen, or more than four fingers other than thumbs of the user's hands are in contact with the display screen; and
  responding to the touch event for the at least one edge, when the gesture of the user holding the mobile terminal does not match the target gesture.

14. The non-transitory storage medium according to claim 13, wherein shielding the touch event for the at least one edge, when determining that the gesture of the user holding the mobile terminal matches a target gesture comprises:
  shielding the touch event for the at least one edge, when the gesture of the user holding the mobile terminal is holding with at least one hand.

15. The non-transitory storage medium according to claim 13, wherein shielding the touch event for the at least one edge, when determining that the gesture of the user holding the mobile terminal matches a target gesture comprises:
  determining that the gesture of the user holding the mobile terminal matches the target gesture and shielding the touch event, when a contact area of a user's hand with the display screen is greater than a target threshold and the contact shape meets a target condition.

16. The non-transitory storage medium according to claim 15, wherein determining the gesture of the user holding the mobile terminal matches the target gesture, when the contact area of the user's hand with the display screen is greater than the target threshold and the contact shape meets the target condition comprises:
  determining that the gesture of the user holding the mobile terminal with one hand is the target gesture, when the contact area of the user's hand with the display screen is greater than the target threshold and the contact shape indicates that four fingers other than a thumb in the user's hand are in contact with the display screen.

17. The non-transitory storage medium according to claim 15, wherein determining the gesture of the user holding the mobile terminal matches the target gesture, when the contact area of the user's hand with the display screen is greater than the target threshold and the contact shape meets the target condition comprises:
  determining that the gesture of the user holding the mobile terminal with two hands is the target gesture, when the contact area of the user's hand with the display screen is greater than the target threshold and the contact shape indicates that more than four fingers of the user's hands other than thumbs are in contact with the display screen.

18. The non-transitory storage medium according to claim 14, wherein shielding the touch event for the at least one edge, when determining that the gesture of the user holding the mobile terminal matches a target gesture comprises:
  determining that the gesture of the user holding the mobile terminal matches the target gesture and shielding the touch event, when a contact area of a user's hand with the display screen is greater than a target threshold and the contact shape meets a target condition.

\* \* \* \* \*